United States Patent [19]

Fitch, Jr.

[11] Patent Number: 4,801,097
[45] Date of Patent: Jan. 31, 1989

[54] FOOD PRODUCT INGREDIENT DISPENSING APPARATUS

[76] Inventor: Clifford E. Fitch, Jr., R.R. #2-Box 74 C, Beecher, Ill. 60401

[21] Appl. No.: 128,737

[22] Filed: Dec. 4, 1987

[51] Int. Cl.$^4$ ............................................. B02C 25/00
[52] U.S. Cl. ....................................... 241/34; 241/36; 241/66; 241/94; 222/255; 222/262
[58] Field of Search .................... 141/82, 196; 241/65, 241/34, 84.4, 66, 82.1–82.5; 222/262, 263, 255

[56] References Cited

U.S. PATENT DOCUMENTS

| | | | |
|---|---|---|---|
| 3,525,374 | 8/1970 | Fitch | 241/84.4 |
| 4,076,482 | 2/1978 | Whetstone | 222/255 X |
| 4,666,067 | 5/1987 | Torterotot | 222/262 |
| 4,700,899 | 10/1987 | Powers et al. | 241/82.5 X |

*Primary Examiner*—Mark Rosenbaum
*Attorney, Agent, or Firm*—Wallenstein, Wagner, Hattis & Strampel, Ltd.

[57] ABSTRACT

Automatic apparatus for dispensing a food material such as pizza meat. The apparatus utilizes a rotatable valve for conveying a food material from a source thereof to an intermediate, or portioning, cylinder, to a main cylinder where it is introduced into a dispensing station which includes a reciprocatable knife plate. An air actuator is used to rotate the rotatable valve. Non-contact solid state sensors, and pneumatic control valves are employed to control the continuous movement of a food material through the apparatus.

29 Claims, 8 Drawing Sheets

FOOD PRODUCT INGREDIENT DISPENSING APPARATUS

FIELD OF THE INVENTION

The present invention relates to an automatic apparatus for dispensing a preselected quantity of an ingredient of a food product at a stage intermediate to the final stage in the preparation of the product.

BACKGROUND OF THE PRIOR ART

In U.S. Pat. No. 3,525,374 there is disclosed a pizza meat dispenser which includes a hopper for receiving pizza meat, and a motor operated lead screw connected to a plunger in the hopper for forcing the pizza meat through dispensing means positioned below the hopper. The dispensing means shown in the patent includes a mold plate, a shear plate and a reciprocatable knife plate therebetween, all having holes which are in alignment when the knife plate is in one of its positions. A second motor reciprocates the knife plate. The motor for the lead screw and the motor for the knife plate are driven in timed relation to enable pizza meat to be extruded from the hopper by the plunger, and to be severed by the knife plate as it is extruded into the dispensing means. While the dispenser of U.S. Pat. No. 3,525,374 satisfactorily functions to dispense pizza meat in an automated pizza making operation, its use of a relatively large meat containing hopper which has to be re-filled at regular intervals, and a motor operated lead screw and plunger to extrude the meat through the dispensing means, coupled with the use of a motor driven eccentric and roller arrangement for reciprocating the knife plate, detracts from its desirability for use in a high-speed, mass production operation.

BRIEF SUMMARY OF THE INVENTION

In accordance with the present invention, automatic apparatus has been evolved for dispensing a component or ingredient of a multi-component, or multi-ingredient food product, which is especially adapted for use in a high-speed, mass production operation for making such a product. The apparatus is compact, easy and safe to operate for prolonged periods, and can be readily disassembled for cleaning and sanitation purposes. The apparatus, furthermore, consistently and uniformly dispenses only the optimum quantity of a component or ingredient used in making the end product thereby enabling food material costs to be carefully controlled while essentially eliminating any food material loss or waste.

The apparatus, in brief, comprises a base portion having a central opening therethrough. The base portion supports a main cylinder which defines a chamber aligned with the central opening in the base portion. A reciprocatable piston is positioned in the chamber of the main cylinder. A mold plate, having a plurality of spaced openings therethrough, is carried by the base portion in the central opening thereof. A support ring which carries a shear plate is removably secured to the base portion. The shear plate has a plurality of spaced openings therethrough which are in register with the spaced openings in the mold plate. A perforated knife plate is reciprocatably carried between the mold plate and the shear plate. The knife plate is provided with an extension which is joined to the piston of a two-stage knife cylinder. The reciprocatable movement of the knife plate is controlled by sensor means which activate pneumatic control valve means associated with programmable solid state circuit board control means.

A conduit, having its outlet end in communication with the chamber in the main cylinder, is carried by the reciprocatable piston of the main cylinder. The inlet end of the conduit is in communication with rotary valve means operated by air actuator means. The rotary valve means in one of its positions is in communication with a stuffer connected to a source of food material, and in another of its positions is in communication with a portioning cylinder. The operation of the rotary valve, the portioning cylinder, the piston of the main cylinder, and the reciprocatable knife plate are controlled by sensor means and pneumatic control valve means associated with the programmable solid state circuit board control means to enable the apparatus to continuously and consistently dispense an optimum quantity of a food material. All components of the apparatus coming into contact with a food material are fabricated of stainless steel, and can be readily disassembled for cleaning.

The foregoing, and other features and advantages of the apparatus will become apparent to those skilled in the art upon reference to the accompanying detailed description of a preferred embodiment of the invention, the claims, and the drawings.

DETAILED DESCRIPTION OF THE INVENTION

Referring, now, in greater detail to FIGS. 1, 2, 3 and 4 of the drawings, the embodiment of the apparatus illustrated, and designated generally by reference numeral 10, includes a base portion 12 adapted to be supported on a surface such as a table 14 by legs 16. The base portion 12 has a central opening 18 therethrough having an annular recess 20 formed in an annular extension 22 thereof for removably receiving the lower open end of a main cylinder 24. The upper open end of the main cylinder 24 carries a removable closure member 26 having a central opening 28 therethrough in axial alignment with the opening 18 in the base portion. The closure member 26 is maintained in position on the open upper end of the main cylinder 24 by pins or rods 30, the ends of which are threaded. One of the threaded ends of each of the rods 30 is received in a tapped bore formed in outwardly extending ears 32 provided on the annular extension 22 of base portion 12. The other threaded end of each of the rods 30 extend through bores provided in the closure member 26, and are drawn up tight by means of wing nuts 34 (see FIG. 1).

As best shown in FIGS. 2, 3, 4, and 5, a circular mold plate 40 is releasably secured to the bottom side of the base portion 12, below the main cylinder 24. The mold plate 40 is provided with a plurality of frusto-conical projections defining holes 44 therethrough. A support ring 46 is carried by the threaded ends of the rods 30 which extend into and through the ears 32 of the annular extension 22 of the base portion 12. The support ring 46 has a shear plate 48 releasably secured to it, and is provided with a plurality of frusto-conical projections which extend in a direction opposite to that of the projections formed in the mold plate 40, and define holes 50 which are in alignment with the holes 44 in the mold plate 40.

Figure 2:
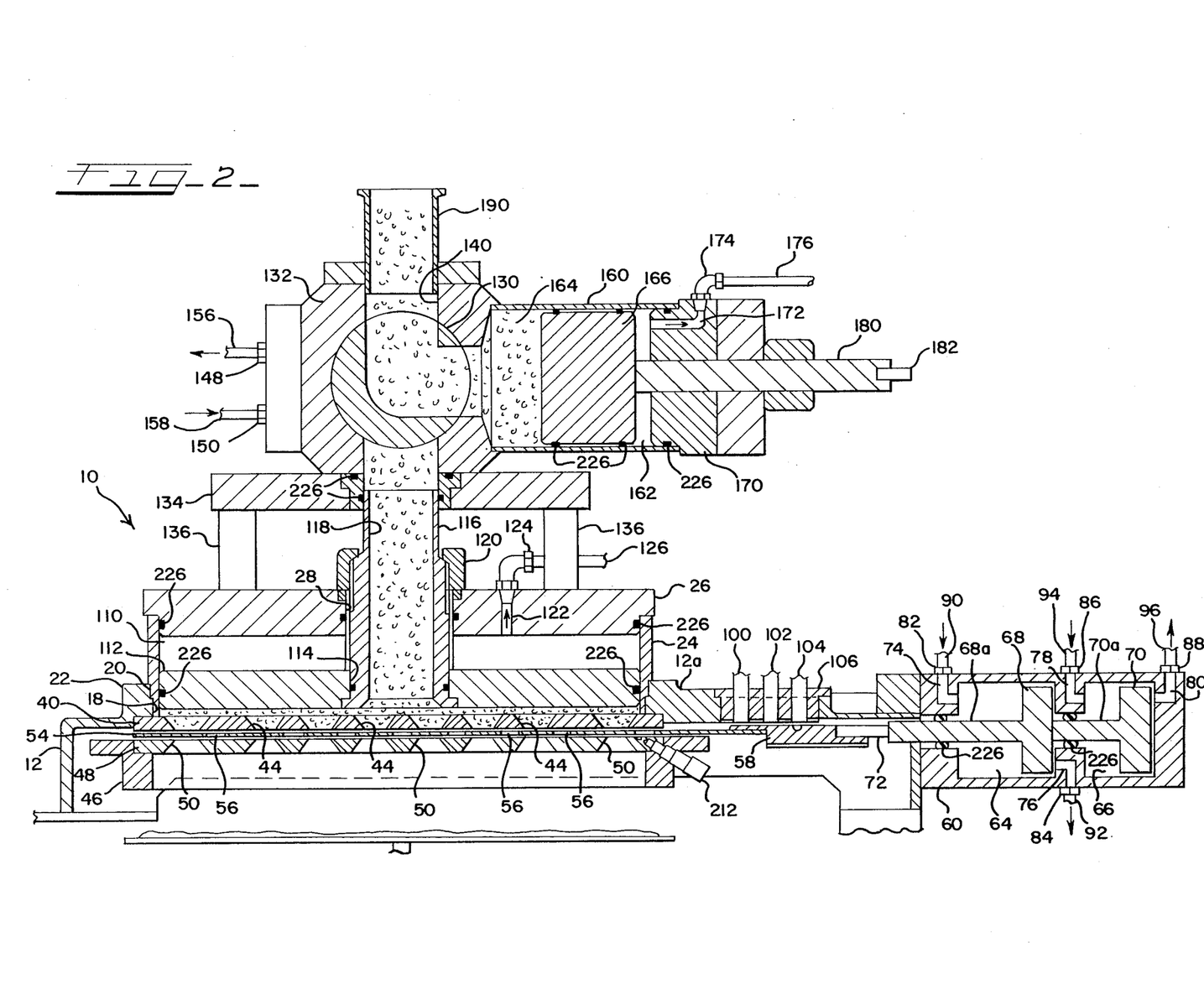
FIG. 2 is a vertical sectional view of said embodiment of the apparatus showing the position of the rotary valve means when a food material such as pizza meat is being introduced into the portioning cylinder, and the knife plate is in a fully retracted, closed position.
Figure 3:
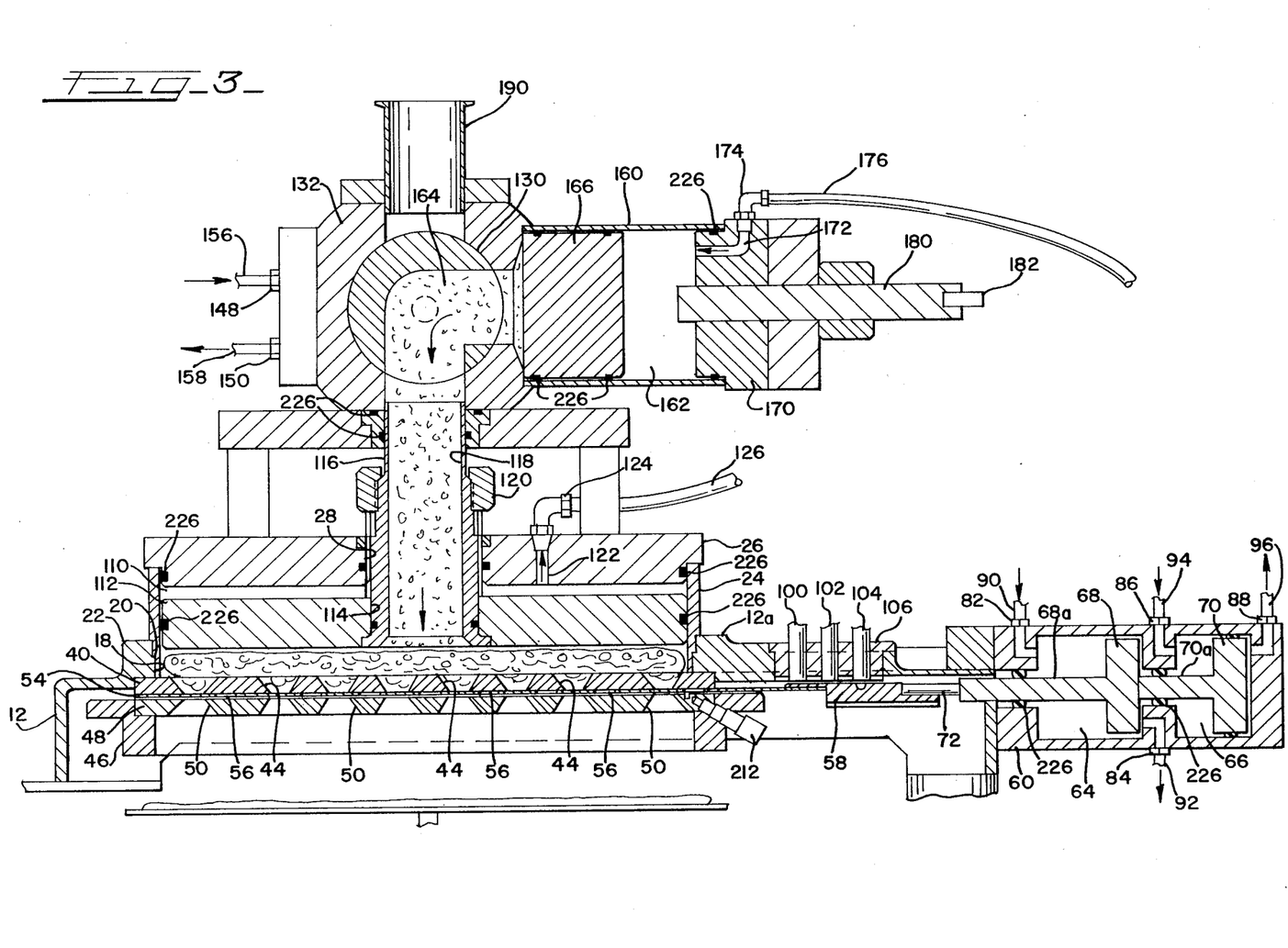
FIG. 3 is a view corresponding to the view of FIG. 2, showing the position of the rotary valve means when a food material such as pizza meat is being introduced into the chamber of the main cylinder, and the knife plate is still in a fully retracted, closed position.
Figure 4:
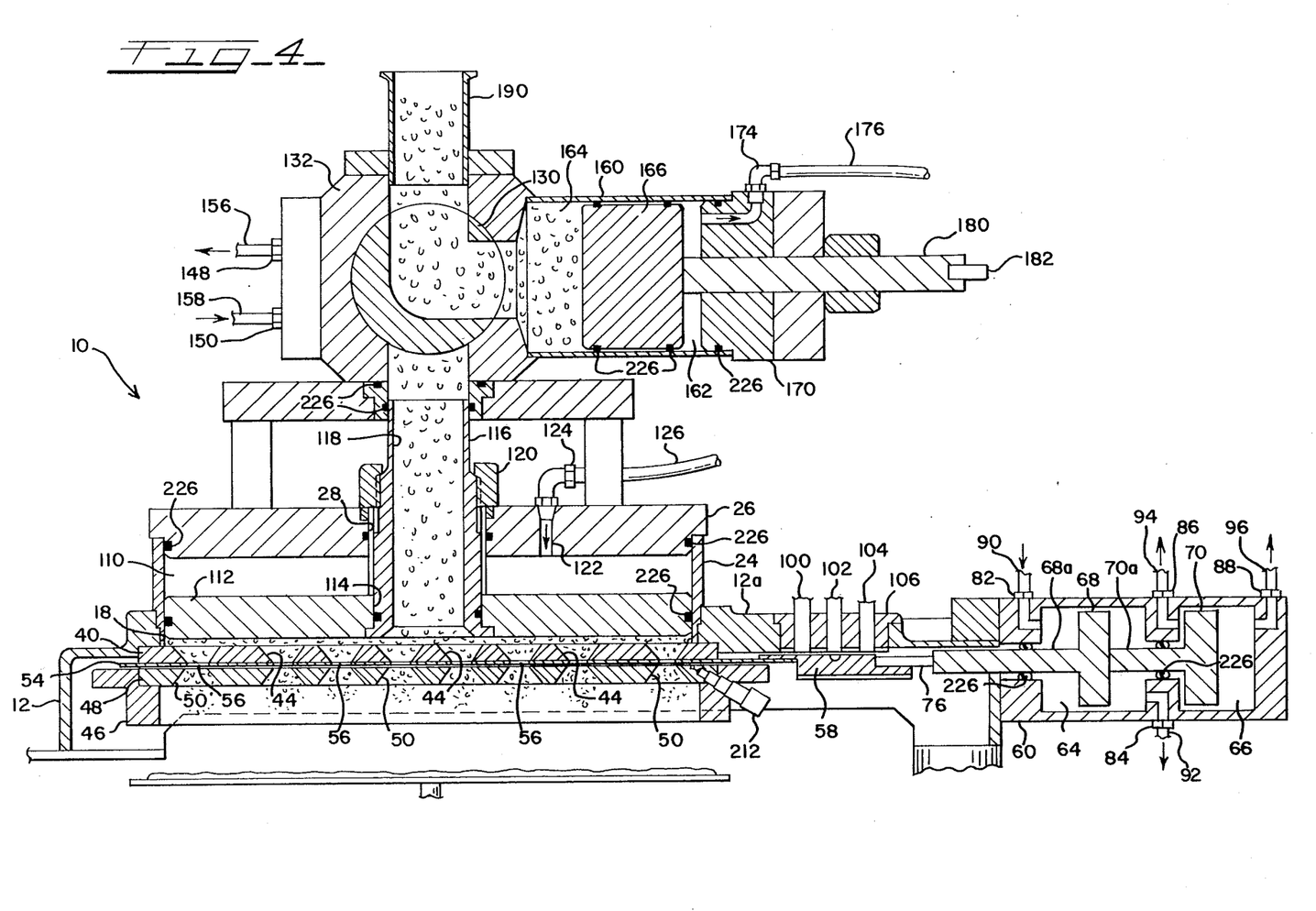
FIG. 4 is a view corresponding to the views of FIGS. 2 and 3 showing the rotary valve in a load position with relation to the portioning cylinder, and the knife plate in its open position.

Interposed between the mold plate 40 and the shear plate 48 is a knife plate 54 having a plurality of holes 56 therethrough, the holes 56 being in alignment or in register with the holes 44 and 50 of the mold plate 40 and the shear plate 48, respectively, when the knife plate 54 is in a mid or normal position as shown in FIG. 4. The knife plate 54 is reciprocatably supported between the mold plate 40 and the shear plate 48, and is provided with an extension 58. The spacing between the mold plate 40 and the shear plate 48 is such as to bring the edges of the frusto-conical projections defining the holes 44 and 50 substantially against the knife plate 54 and yet allow the knife plate to be readily reciprocated without binding. It should be mentioned here that the adjustment of the mold plate 40 and the shear plate 48 in relation to the knife plate 54 is achieved in the same manner as described in U.S. Pat. No. 3,525,374, and to the extent that the subject matter of that patent shares commonality to the arrangement of the mold plate 40, the shear plate 48 and the knife plate 54 of the present invention, it is incorporated herein by reference. In this same connection, the mold plate 40, the shear plate 48 and the knife plate 54, in marked contrast to the corresponding elements of the apparatus disclosed in U.S. Pat. No. 3,525,374, are fabricated of heavy gauge metal, and the frusto-conical projections which form the holes 44, 50 and 56 in said plates are machined and not punched out with a die as taught in the patent. The stability of the heavier plates minimizes deflection resulting in improved portion control consistency.

Reciprocation of the knife plate 54 advantageously is achieved by a two-stage, three position knife cylinder 60. The cylinder 60 is provided with two chambers 64 and 66 each containing a reciprocatable piston 68 and 70 respectively. The pistons 68 and 70 have associated piston rods 68a and 70a, have respectively, the rod 68a being connected to the extension 58 of the knife plate 54 through a rod 72 for reciprocating the knife plate 54. Each of the chambers 64 and 66 are provided with a pair of passageways 74 and 76, and 78 and 80, respectively. The passageways are provided with fittings 82 and 84, and 86 and 88, respectively, which are connected to conduits or hoses 90 and 92, and 94 and 96, respectively, the conduits or hoses being in communication with a source of pressurized air (not shown).

Figure 5:
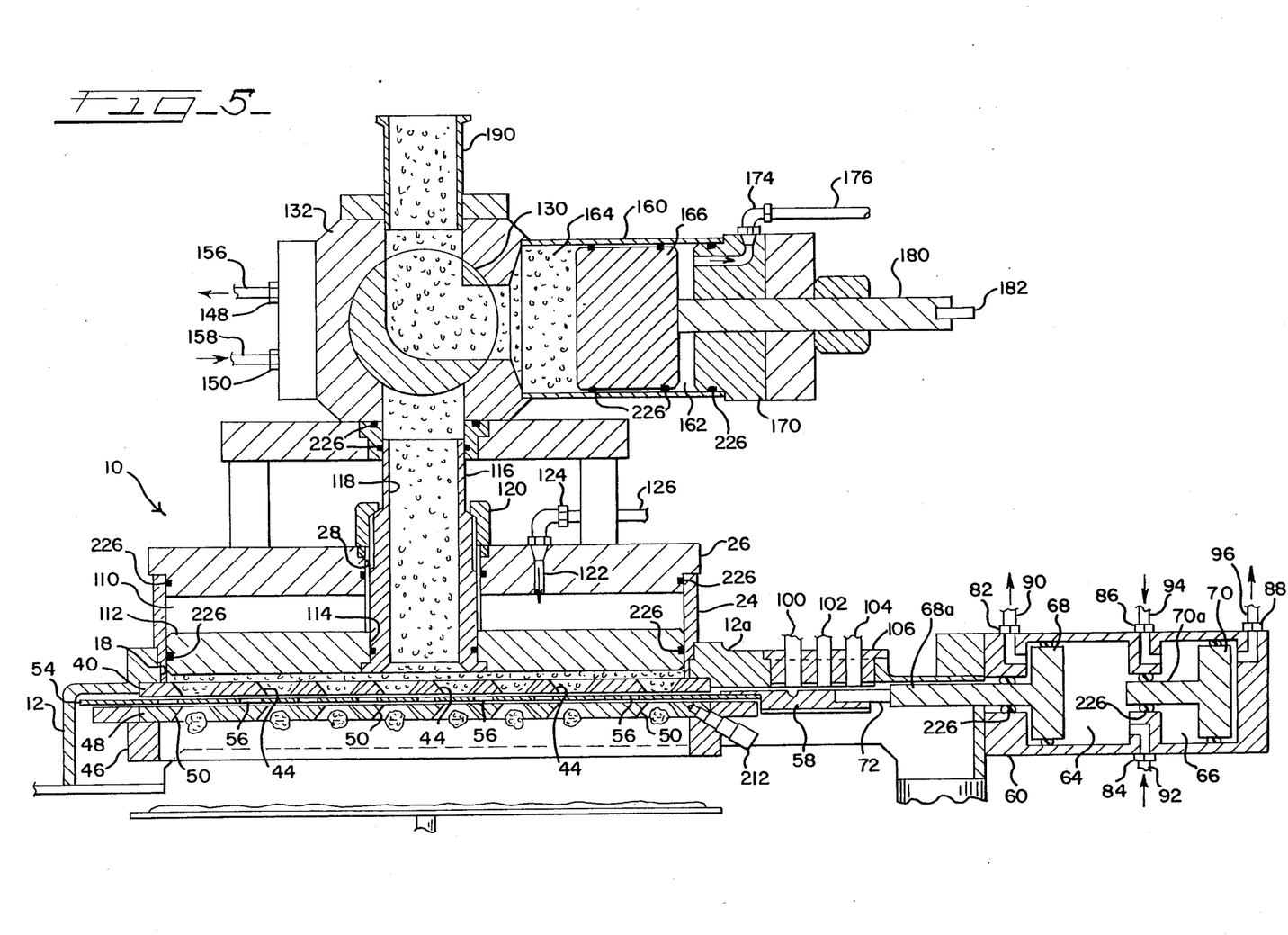
FIG. 5 is a view corresponding to the view of FIG. 4 showing the knife plate in its fully extended, closed position after cutting the pizza meat.
Figure 10:
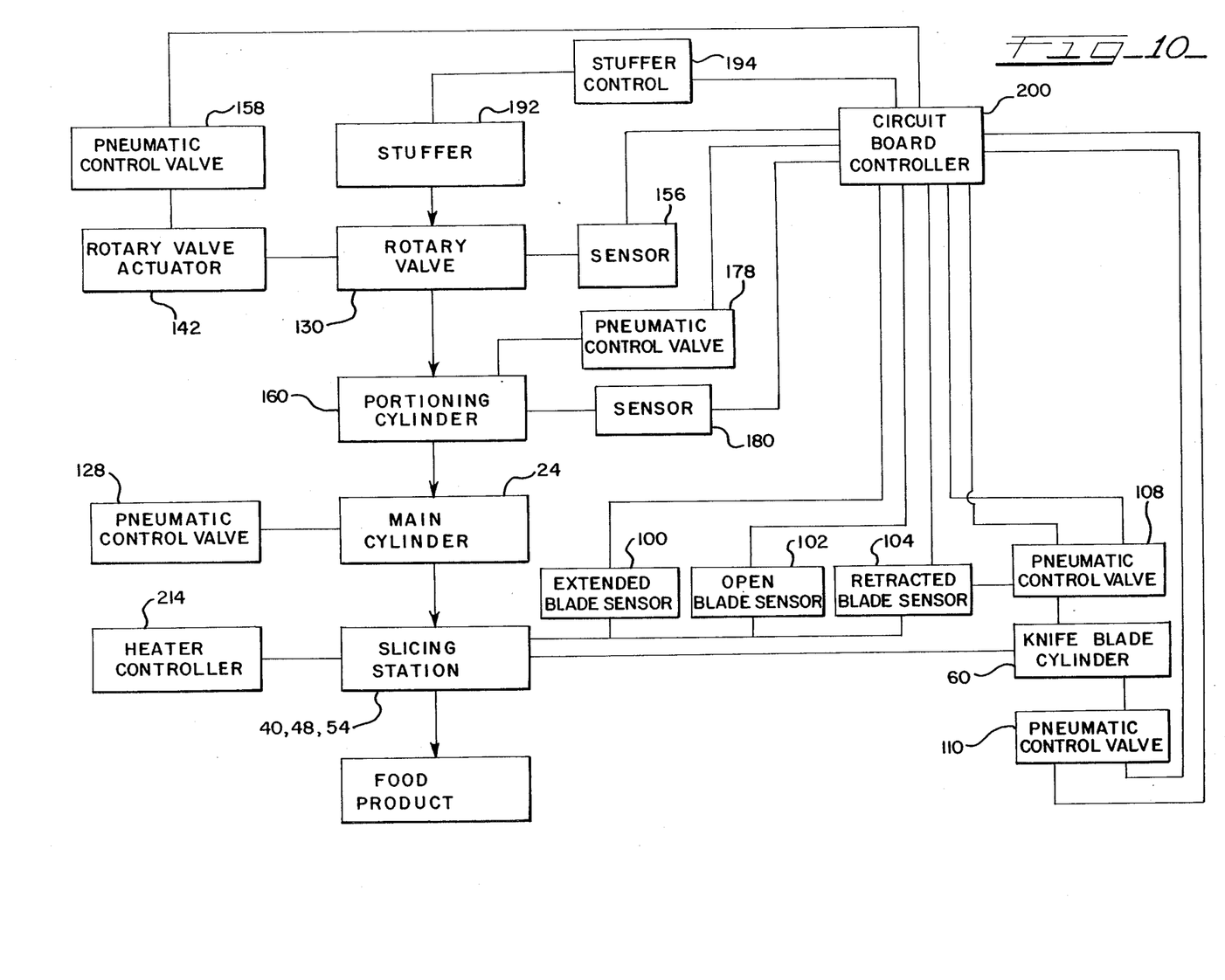
FIG. 10 is a flow diagram showing the sequence of steps involved in dispensing a food material with the apparatus.

The operation of the two-stage, three position knife cylinder 60 is controlled by three non-contact, solid state sensors 100, 102 and 104 which are supported by a plug member 106 in an opening in an extension 12a of the base portion 12. The sensors 100, 102 and 104, as schematically shown in FIG. 10, are connected to pneumatic control valves 108 and 110 which are operated by a programmable single circuit board (see FIG. 10). Energization of the sensor 100 controls the full extension of the knife plate 54 to a closed position, as shown in FIG. 5. Energization of the sensor 102 controls the movement of the knife plate 54 to an open position as shown in FIG. 4. Energization of the sensor 104 results in the retraction of the knife plate 54 to a retracted, closed position, as shown in FIG. 3.

The main cylinder 24 defines a chamber 110 which receives a reciprocatable piston 112 having a central opening 114 in which is engaged one end of a hollow piston rod 116. The piston rod 116 defines a conduit 118 for admitting food material into the chamber 110 below the piston 112. Piston stroke limiting means such as a nut 120 is secured to the piston rod 116, and rides with the rod 116 as the piston 112 is reciprocated in the chamber 110 (see FIG. 3). A passageway 122, in communication with the chamber 110, is provided in the closure member 26. A fitting 124 is provided for the passageway 122 and is connected to a conduit or hose 126 which is in communication with said source of air under pressure. As schematically shown in FIG. 10, the main cylinder 24 is connected through passageway 122 and hose 126 to a pneumatic control valve 128 for controlling the admission and venting of pressurized air from the chamber 110. The operation of the valve 128, in turn, is controlled by the aforementioned programmable solid state single circuit board.

The inlet end of the conduit 118 defined by the piston rod 116 is in communication with a rotary valve 130 supported in a head member 132. The head member 132, in turn, is supported on a plate member 134 by rods 136, the ends of each of which are threaded, one of the ends being engaged in tapped bores formed in the closure member 26, and the other end of each rod extending through holes in the head plate member 134 and being tightly secured in position by wing nuts 138 (see FIG. 1).

Figure 6:
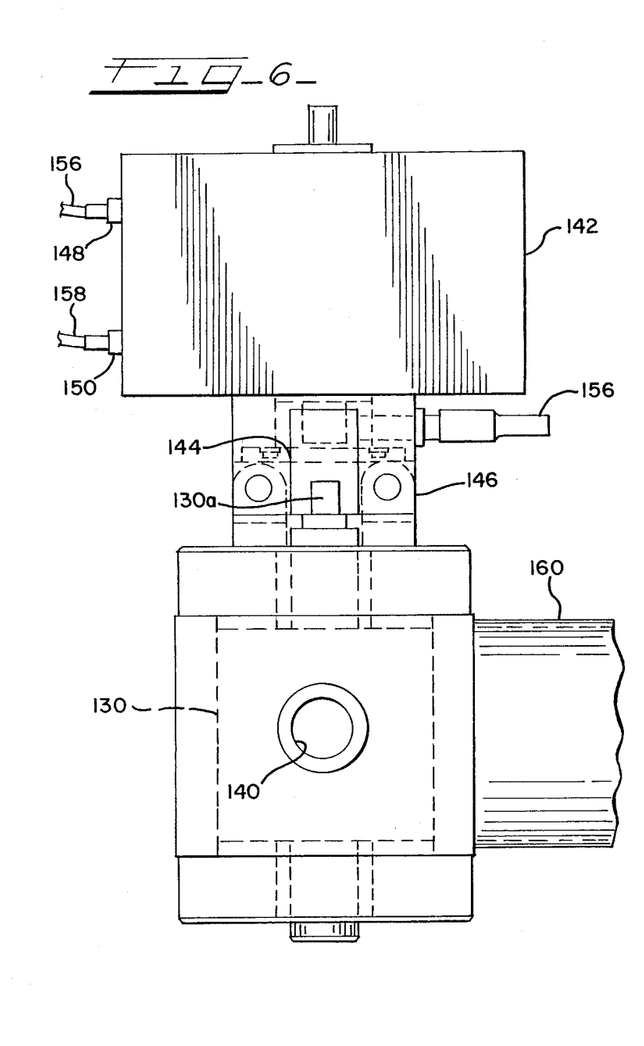
FIG. 6 is a fragmentary top plan view showing the relationship of the air actuator means to the rotary valve means.

The rotary valve 130 has an open ended passageway 140 formed therein which is angled at approximately an angle of 90° for reasons that will become clear as the description proceeds. As best illustrated in FIG. 6, the rotary valve 130 is provided with a shaft 130a, one end of which is journaled for rotation in a solid state air actuator 142 by means of a coupling 144. The actuator 142 desirably is supported on the head member 132 by a bracket 146. Fittings 148 and 150, to which conduits 152 and 154, respectively, are connected are provided for admitting air under pressure to, and venting it from the actuator 142 as indicated by arrows in FIGS. 2, 3, 4 and 5. Control of pressurized air into and out of the actuator is achieved by a sensor 156 for the rotary valve 130, and a pneumatic control valve 158 connected to the actuator 142 (see FIG. 10). The air actuator 142 is a standard unit available commercially, and is pre-set to rotate the valve 130 through a 90° angle. One such unit is sold by Worcester Controls Corporation under the model designation 1539.

The head member 132 also supports a portioning cylinder 160 having a chamber 162 for receiving a food material 164 to be dispensed by the apparatus. A reciprocatable piston 166 is positioned in the cylinder 160. The chamber 162 of the portioning cylinder 160 is in communication with the rotary valve 130 at one end, and is provided with a closure member 170 at its other end. A passageway 172 is formed in the member 170, and is provided with a fitting 174 which is connected to a conduit 176 in communication with a pneumatic control valve 178. A pneumatic valve control 180 (see FIG. 10) is provided for the portioning cylinder 160 for regulating the flow of pressurized air into and from the chamber 162 of the cylinder 160 through the passageway 172. The closure member 170, as illustrated, is provided with an axial bore in which a spring biased sensor activating rod 180 is received. A solid state non-contact sensor 182, positioned at the end of the rod 180, is energized by the movement of the rod 180 in response to the movement of the reciprocatable piston 166 of the cylinder 160. Energization of the sensor 182, activates the pneumatic control valve 178 is communication with the chamber 162 of the cylinder 160 through the passageway 172 and the conduit 176.

An intake conduit 190 advantageously is positioned on the head member 132. The inlet of the conduit 190 desirably is connected to a stuffer 192 (see FIG. 10) provided with means such as a worm screw for continuously feeding a food material 164 into the apparatus.

Referring, now, in particular, to FIG. 10 of the drawings, in operation, a food material 164, such as pizza meat is continuously fed to the inlet of the rotary valve 130 from the stuffer 192 as long as the rotary valve 130 is in the "fill" position and the portioning cylinder sensor 182 is signaling a demand for product, activating a stuffer control 194. When the rotary valve 130 is in its "fill" position as shown in FIG. 2, the food material 164 is directed into the portioning cylinder 160 causing the piston 166 to move until the rod 180 reaches a point where the sensor 182 is energized. Actuation of the sensor 182 disables stuffer operation and energizes the pneumatic control valve 178 causing the rotary valve actuator 142 to turn 90° 90 driving the rotary valve 130 to a "charge" position as illustrated in FIG. 3. When the rotary valve 130 has reached this position, the rotary valve sensor 156 is energized and the pneumatic control valve 178 is energized, sending pressurized air into the chamber 162 portioning cylinder 160 causing the piston 166 to move in the direction of the rotary valve 130. The food material 164 from the portioning cylinder 160 is forced through the conduit 118 into the chamber 110 below the piston 112 in the main cylinder 24. At this time, the knife plate 54 is in a closed position as shown in FIGS. 2 and 3. As the food material 164 enters the chamber 110 of the main cylinder 24, it raises the piston 112 to accommodate the food material mass.

After a programmed time delay, which is regulated by the software driven, programmable solid state, single circuit board designated by reference numeral 200 in FIG. 10, the pneumatic control valve 178 connected to the portioning cylinder 160 is deenergized, venting the chamber 162 to atmosphere. The pneumatic control valve 158 associated with the valve actuator 142 is deenergized sending pressurized air into the actuator 142, as indicated by the arrow, to drive the rotary valve 130 back to the "fill" position shown in FIG. 2. At the same time, the pneumatic control valve 108 is energized by the sensor 100 causing pressurized air to enter the chamber 64 behind the piston 68 of the cylinder 60 thereby extending the knife plate 54 to its fully extended open position as shown in FIG. 5. When the sensor 102 is energized, the knife plate 54 is moved to its "open" position by the action of the pistons 68 and 70 of the cylinder 60, as shown in FIG. 4, that is, the holes 56 in the knife plate 54 are in register with the holes 44 and 56 in the mold plate 40 and the shear plate 48, respectively, and, at the same time, the pneumatic control valve 128 associated with the main cylinder 24 is activated sending low pressure air into the chamber 110 thereby causing the piston 112 to move downwardly to force the food material through the registered openings.

After another programmed time delay, the knife blade 54 is moved by the action pistons 68 and 70 of the cylinder 60 to its fully retracted position as shown in FIGS. 2 and 3 causing the holes 56 in the knife plate 54 to be moved out of register with the holes in the mold plate 40 and the shear plate 48. When the sensor 104 is activated, reciprocatable movement of the knife plate 54 takes place as a result of the energization and deenergization of the pneumatic control valve 108. The knife plate 54 during this sequence is moved from its extended closed position, to is open position, to its retracted closed position three times. When the knife plate 54 is in its retracted closed position and the slicing or cutting sequence is complete, the apparatus is ready to go through another cycle. The flow of pressurized air into and out of the chambers 64 and 66 of the cylinder 60 during each cycle is indicated by arrows in FIGS. 2, 3, 4 and 5. The relative positions of the pistons 68 and 70 of the cylinder 60, and the position of the knife plate 54 in relation to the mold plate 40 and the shear plate 48, when pressurized air is introduced into and vented from the chambers 64 and 68 during each cycle also is depicted in said figures of the drawings.

Figure 7:
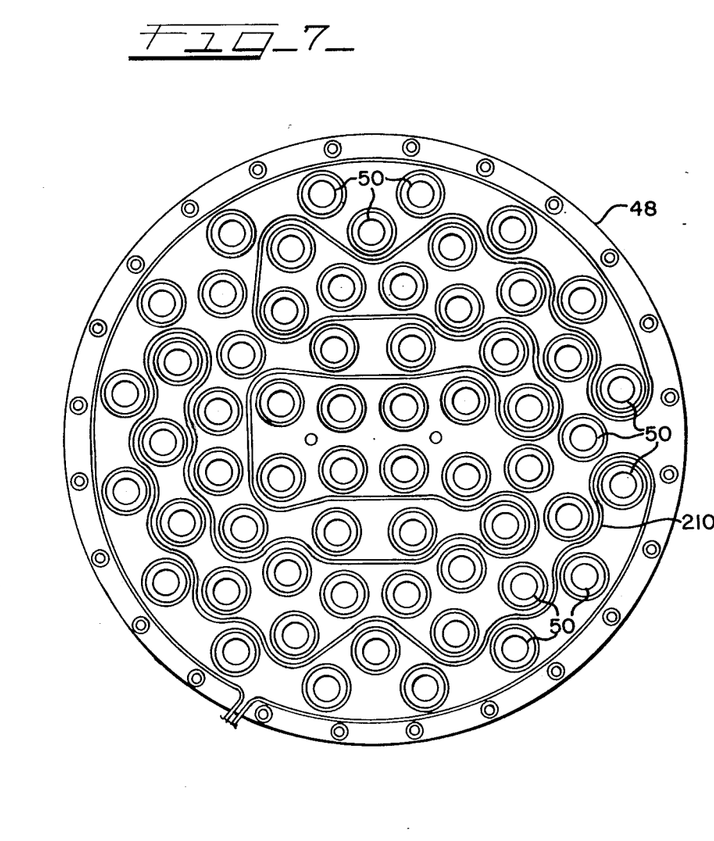
FIG. 7 is a top plan view of the shear plate of said embodiment showing the heater wire.

As shown in FIG. 7, a cable heater 210 with an integral type J thermocouple sensor is arranged on the upper side of the shear plate 48 and extends around the frustoconical projections for the purpose of heating the shear plate. The heater may be potted into place by a suitable inert, heat-resistant material. The heater and thermocouple extend to a socket having prongs for a cable connection 212. The socket receives a plug end cable for supplying electrical energy to the heater and interface of the thermocouple from a heater controller 214 (see FIG. 10). The cable heater, thermocouple and adjustable heater controller provide a closed loop heating system. The purpose of heating the shear plate is to prevent food material from sticking to the shear plate thereby preventing blocking of the holes 50 therein, and, also, to provide consistent pattern application.

Figure 8:
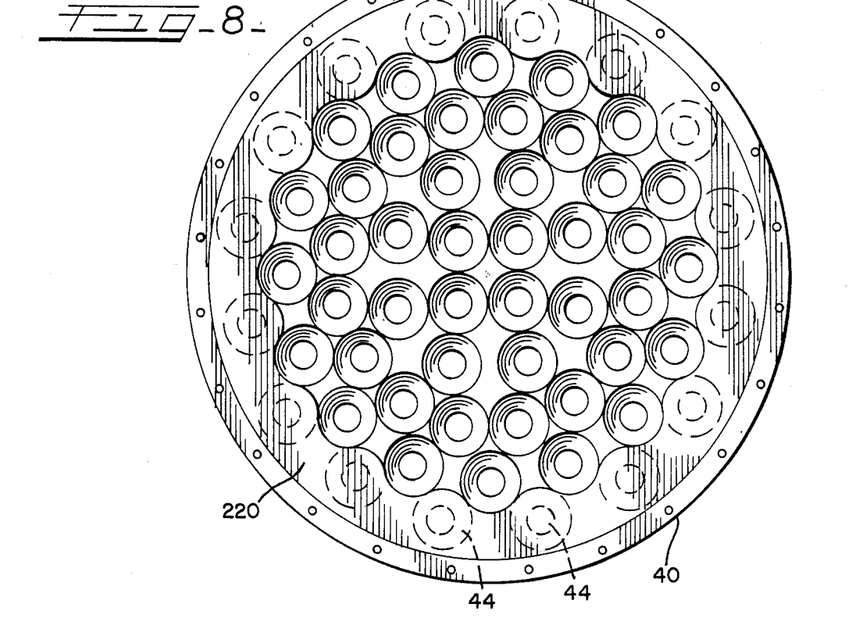
FIG. 8 is a top plan view of the mold plate showing ring means for reducing the area of the mold plate through which a food ingredient is dispensed.
Figure 9:
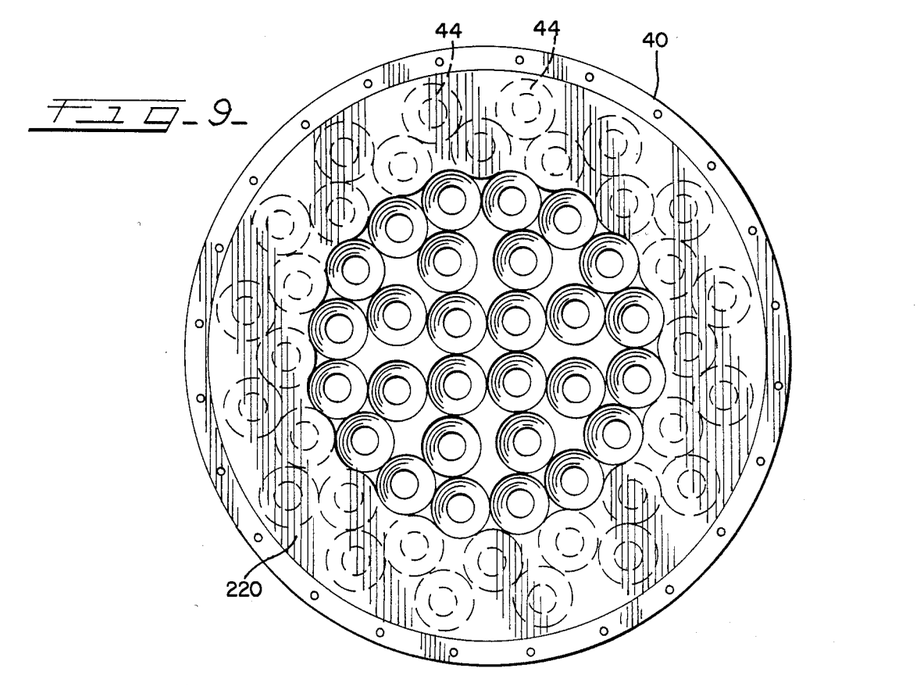
FIG. 9 is a view corresponding to the view of FIG. 8 showing ring means of another size for reducing the meat dispensing area of the mold plate.

A further important feature of the apparatus of the present invention is illustrated in FIGS. 8 and 9. As shown, rings or circular plates 220 and 222 of different diameters are positioned on the mold plate 40 blocking holes 44 along the periphery of the mold plate 40, and acting to limit the area of the mold plate through which a food product will pass. This feature is important, for example, when the apparatus is employed to dispense pizza meat, enabling the apparatus to be used to make pizzas of different sizes such as 9 and 12 inch pizzas.

As clearly shown in FIGS. 2, 3, 4 and 5, sealing means such as "O" rings or quad rings 226 are provided wherever necessary to insure a closed, seepage-free system.

Figure 1:
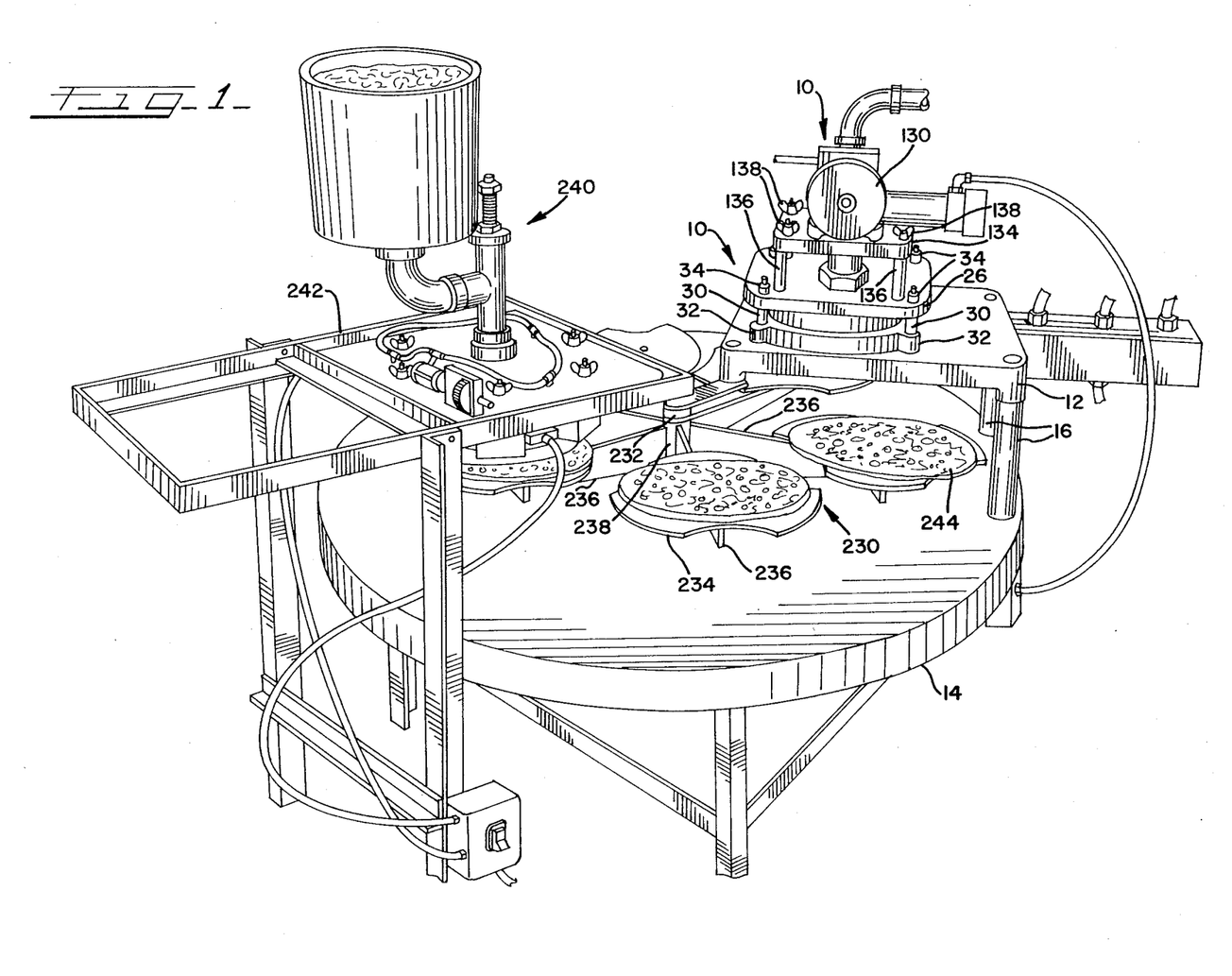
FIG. 1 is a view in perspective of an embodiment of the apparatus of the present invention showing it being used in an automated pizza product operation in combination with a sauce dispenser.

As stated above, the apparatus of the present invention is especially adapted for use in a high speed, mass production operation for making a multiple component end product such as pizzas. In FIG. 1 of the drawings, an example of an automated arrangement for making pizzas utilizing the apparatus of this invention is illustrated. The apparatus 10 is mounted on the table 14 which supports a circular conveyor 230 mounted for rotation on a motor driven spindle 232 extending through an opening in the table 14. The conveyor 230 comprises a plurality of equally spaced plate members 234 connected by arms 236 to a sleeve 238 carried on the upper end of the spindle 232. An automatic sauce dispensing unit 24 of the type disclosed in copending patent application Ser. No. 045282, filed May 4, 1987, is supported by a frame 242 positioned adjacent to the table 14. After the unit 242 has dispensed a flowable material such as tomato sauce on the dough 244 carried by the plate members 234, the sauce coated dough is automatically moved to the apparatus 10 where a measured quantity of pizza meat is dispensed onto the sauce layer. The movement of the conveyor, and the operation of the sauce dispensing unit 240 and the apparatus 10 are controlled in a manner to position a plate member 234 under the unit 240 and the apparatus 10 at the same time. Dispensing of a food component by the unit 240 and the apparatus 10 occurs in a fraction of a second. The thusly coated pizza dough can then be automatically conveyed to further processing equipment necessary to develop a completed product. The operation of the conveyor, of course, is coordinated with the operation of the dispensing unit 240 and the apparatus 10 so that there is no interruption in the production operation. While the apparatus 10, in the illustrative example has been described as being used for dispensing pizza meat, it can also be used to dispense other pizza toppings amenable to shredding or slicing.

While for purposes of illustration, a preferred embodiment of the invention has been described, modifications of said embodiment may become apparent to those skilled in the art in the light of said description. Therefore, the scope of the invention is to be limited by the scope of the appended claims.

What is claimed is:

1. A food material dispensing apparatus, comprising: a supporting base portion having an opening therethrough; a main cylinder having a chamber in communication with the opening in the supporting base portion; a reciprocatable piston in the chamber of said main cylinder; an intermediate cylinder having a chamber for receiving a food material from a source thereof; a reciprocatable piston in the chamber of said intermediate cylinder; conduit means, including rotatable valve means, in communication with the chamber of the intermediate cylinder and the chamber of the main cylinder for alternately conveying a food material from said source to the chamber of the intermediate cylinder and from the chamber of the intermediate cylinder to the chamber of the main cylinder; a source of air under pressure for actuating the reciprocatable piston in the chamber of the main cylinder and the reciprocatable piston in the chamber of the intermediate cylinder; and reciprocatable severing means positioned between the main cylinder and the opening in the supporting base for cutting the food material into predetermined sized pieces as the food material in the chamber of the main cylinder is moved into engagement therewith by the reciprocatable piston therein.

2. A food material dispensing apparatus according to claim 1 wherein air actuator means is provided for alternately positioning said rotatable valve means in communication first with the chamber of the intermediate cylinder and then with the chamber of the main cylinder.

3. Apparatus according to claim 2 wherein sensor means is provided for the rotatable valve means for controlling the position of the rotatable valve means with relation to the chamber of the intermediate cylinder and the chamber of the main cylinder.

4. Apparatus according to claim 2 wherein the air actuator means is in communication with a source of pressurized air.

5. Apparatus according to claim 4 wherein pneumatic control valve means is provided for the air actuator means for regulating the rotation of the rotary valve means.

6. Apparatus according to claim 1 wherein reciprocatable sensor energizing means is provided for the intermediate cylinder, said sensor energizing means being adapted to reciprocate in response to the reciprocatable movement of the piston of the intermediate cylinder.

7. Apparatus according to claim 6 wherein sensor means is associated with the intermediate cylinder, said sensor means being energized and deenergized in response to the movement of the reciprocatable piston energizing means by the reciprocatable piston of the intermediate cylinder.

8. Apparatus according to claim 1 wherein pneumatic control valve means is provided for the main cylinder for regulating the flow of pressurized air into and out of the chamber of the main cylinder.

9. Apparatus according to claim 1 wherein pneumatic control valve means is provided for the intermediate cylinder for regulating the flow of pressurized air into and out of the chamber thereof.

10. Apparatus according to claim 1 wherein two-stage, three position cylinder means is provided for the reciprocatable severing means, said two-stage, three position cylinder means having aligned chambers and a reciprocatable piston in each of the chambers.

11. Apparatus according to claim 10 wherein at least one of the pistons of the two-stage, three positions cylinder means is operatively connected to the reciprocatable severing means.

12. Apparatus according to claim 10 wherein the chambers comprising the two-stage, three position cylinder means are in communication with a source of air under pressure.

13. Apparatus according to claim 12 wherein two-stage, three position cylinder means is connected to pneumatic control valve means for regulating the flow of air under pressure into and out of the chambers thereof.

14. Apparatus according to claim 10 wherein sensor means is provided for the reciprocatable severing means, said sensor means serving to control the reciprocation of the reciprocatable severing means from an extended position, to an intermediate position, to a retracted position.

15. Apparatus according to claim 14 wherein the sensor means is connected to pneumatic control valve means through a programmable controller.

16. Apparatus according to claim 15 wherein the pneumatic control valve means is connected to the two-stage, three position cylinder means.

17. Apparatus according to claim 14 wherein the sensor means comprises three noncontact, solid state sensors positioned in aligned relation to one another.

18. Apparatus according to claim 1 wherein non-contact, solid state sensors are provided to control the reciprocation of the piston of the main cylinder, the piston of the intermediate cylinder, the severing means, and the movement of the rotatable valve means.

19. Apparatus according to claim 18 wherein the sensors are connected to a programmable, solid state circuit board.

20. Apparatus according to claim 1 wherein heater means is provided for the severing means to prevent food material from sticking thereto.

21. Apparatus according to claim 1 wherein the rotatable valve is in communication with food material stuffer means, and control means is provided for said stuffer means for regulating the flow of food material from said source to the rotatable valve.

22. A food material dispensing apparatus, comprising: a supporting base portion having a central opening therethrough; a main cylinder having a chamber in communication with the central opening in the supporting base portion; a reciprocatable piston in the chamber of the main cylinder; an intermediate cylinder having a chamber for receiving a food material from a source thereof; a reciprocatable piston in the chamber of said intermediate cylinder; a conduit means, including rotatable valve means, in communication with the chamber of the intermediate cylinder and the chamber of the main cylinder for alternately conveying a food material from said source to the chamber of the intermediate cylinder and from the chamber of the intermediate cylinder to the chamber of the main cylinder; air actuator means for the rotatable valve means; and food material dispensing means, including pressurized air actuated reciprocatable severing means, for receiving and dispensing food material in incremental form from the chamber of the main cylinder.

23. Apparatus according to claim 22 wherein sensor means is provided for monitoring the position of the rotary valve means.

24. Apparatus according to claim 23 wherein sensor means is provided for monitoring the position of the reciprocatable severing means.

25. Apparatus according to claim 23 wherein a reciprocatable piston is carried in the chamber of the intermediate cylinder.

26. Apparatus according to claim 25 wherein reciprocatable sensor energizing means is positioned in operative relation to the reciprocatable piston of the intermediate cylinder.

27. Apparatus acccording to claim 22 wherein a two-stage, three position cylinder is provided for controlling the reciprocation of the severing means.

28. Apparatus according to claim 27 wherein severing means actuated sensor means is provided for controlling the operation of the two-stage, three position cylinder.

29. Apparatus according to claim 20 wherein the heater means comprises a closed loop heater system which includes a cable heater, a thermocouple, and adjustable controller means therefor.

* * * * *

UNITED STATES PATENT AND TRADEMARK OFFICE
CERTIFICATE OF CORRECTION

PATENT NO. : 4,801,097

DATED : January 31, 1989

INVENTOR(S) : Clifford E. Fitch, Jr.

It is certified that error appears in the above-identified patent and that said Letters Patent is hereby corrected as shown below:

Column 10, line 14, please substitute the number --22-- for the number "23"; and Column 10, line 17, please substitute the number --22-- for the number "23".

Signed and Sealed this

Twenty-fourth Day of July, 1990

Attest:

HARRY F. MANBECK, JR.

*Attesting Officer*   Commissioner of Patents and Trademarks